United States Patent
Eggleston

(10) Patent No.: US 6,332,600 B2
(45) Date of Patent: Dec. 25, 2001

(54) ROTARY VALVE APPARATUS

(76) Inventor: Philip W. Eggleston, 1813 Sandra, Sherman, TX (US) 75092

( * ) Notice: Subject to any disclaimer, the term of this patent is extended or adjusted under 35 U.S.C. 154(b) by 0 days.

(21) Appl. No.: 09/772,782

(22) Filed: Jan. 30, 2001

Related U.S. Application Data

(62) Division of application No. 09/441,394, filed on Nov. 16, 1999, now Pat. No. 6,213,141.
(60) Provisional application No. 60/113,086, filed on Dec. 21, 1998.

(51) Int. Cl.[7] .................................................. F16K 1/226
(52) U.S. Cl. ........................... 251/214; 251/306; 251/314
(58) Field of Search .................................... 251/214, 305, 251/306, 307, 308, 314, 316, 317

(56) References Cited

U.S. PATENT DOCUMENTS

| | | | |
|---|---|---|---|
| 4,181,288 | * | 1/1980 | Bylsma ............................ 251/305 X |
| 4,254,937 | * | 3/1981 | Hubertson ............................ 254/305 |
| 4,286,769 | * | 9/1981 | Hubertson ........................ 251/306 X |
| 4,291,863 | * | 9/1981 | Gachot ................................. 251/214 |
| 4,604,254 | * | 8/1986 | Yamamoto et al. ............. 251/306 X |
| 4,659,064 | * | 4/1987 | Scobie et al. ......................... 251/214 |
| 4,711,427 | * | 12/1987 | Holtgraver ........................... 251/308 |
| 4,770,393 | * | 9/1988 | Hubertson ............................ 251/306 |
| 5,152,501 | * | 10/1992 | Raymond, Jr. ....................... 251/305 |

\* cited by examiner

*Primary Examiner*—Kevin Shaver
*Assistant Examiner*—Eric Keasel
(74) *Attorney, Agent, or Firm*—Konneker & Smith, P.C.

(57) ABSTRACT

A rotary valve is provided with an elliptical valve disc that seats against a seal element operatively mounted in an elliptically shaped depression formed in the rigid annular portion of a seal cartridge structure carried by the valve body. Due to the elliptical shapes of the disc and corresponding seating structure, and a conical configuration of the disc periphery, sealing of the valve disc, the integrity of the seal, and the ability of the seal to completely stop the flow of fluid through the valve body are desirably improved. The centering of valve disc relative to the seal cartridge is facilitated by a specially designed disc mounting structure that eliminates any necessity of adjusting the disc along its rotational axis, and a one-piece actuator bracket is removably mounted to the valve body to substantially simplify and reduce the expense of operatively associating an actuator with the valve.

13 Claims, 6 Drawing Sheets

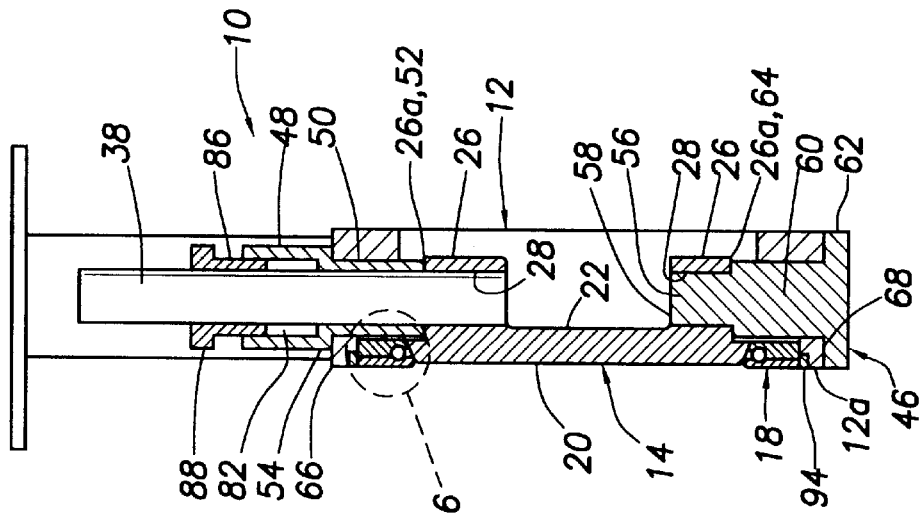
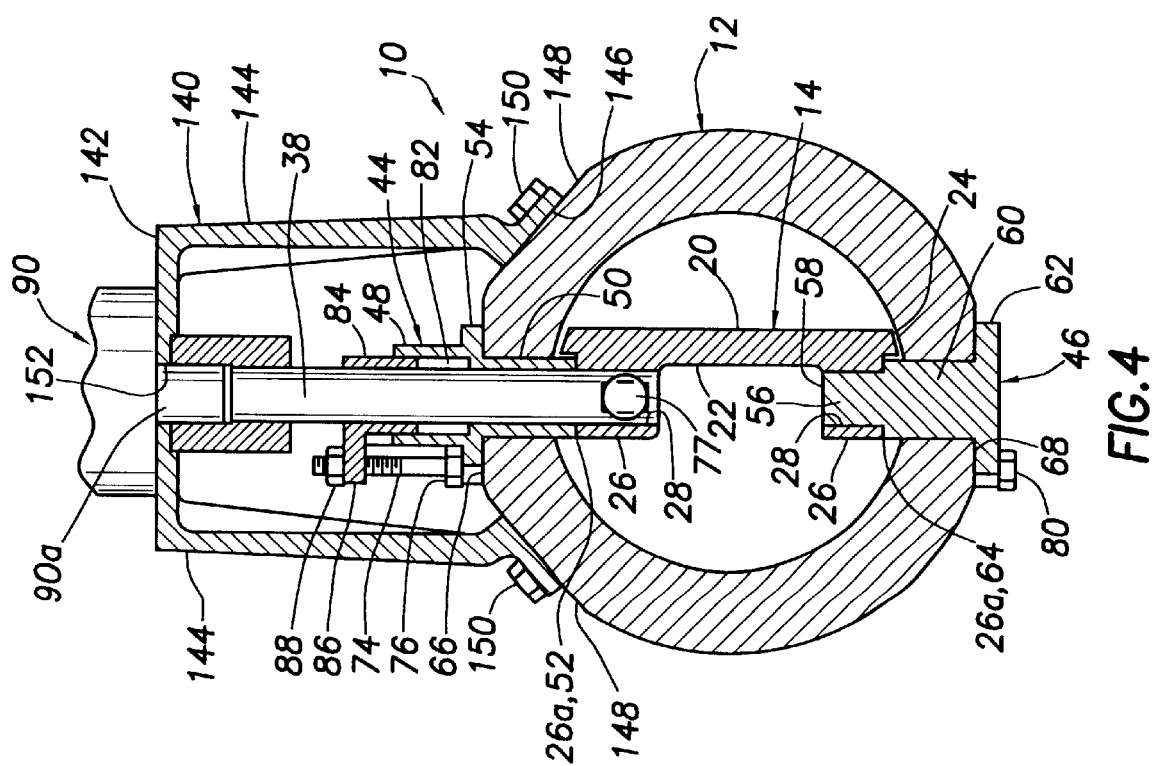

ROTARY VALVE APPARATUS

CROSS-REFERENCE TO RELATED APPLICATIONS

This application is a division of copending U.S. application Ser. No. 09,441,394 filed on Nov. 16, 1999 now U.S. Pat. No. 6,213,141 and entitled "ROTARY VALVE APPARATUS AND ASSOCIATED METHODS", such copending application being hereby incorporated by reference herein in its entirety. In turn, U.S. application Ser. No. 09,441,394 claimed the filing benefit of U.S. Provisional Application Serial No. 60/113,086 filed on Dec. 21, 1998 and entitled "ROTARY VALVE ASSEMBLY", such provisional application also being hereby incorporated by reference herein in its entirety.

BACKGROUND OF THE INVENTION

The present invention generally relates to valves and methods for fabricating them and, in a preferred embodiment thereof, more particularly relates to rotary valves, such as "butterfly" valves, and associated valve fabrication methods.

Rotary valves, also commonly referred to as "butterfly" valves, are typically provided with a shut-off disc which is rotationally drivable between open and closed positions about an axis diametrically extending across the interior of a generally annular valve body. In its open position the disc permits fluid flow through the valve body, and when the disc is rotated to its closed position its periphery is brought into operative engagement with an annular seal member, which is part of an annular seal cartridge structure supported by the valve body, to shut off further fluid flow through the valve and piping sections that are suitably secured to opposite sides of its body portion.

Although rotary valves of this general type have been utilized for many years in both fluid throttling and shut-off applications, and have been refined in a variety of manners over this time span, they are still subject to several well-known problems, limitations and disadvantages. For example, rotary valve discs are customarily formed as a segment of a sphere and thus have a rounded peripheral seating surface. Because of this conventional disc configuration it is often difficult to reliably and accurately conform the valve seal to the peripheral disc seating surface without undesirably stretching the seal element to a substantial degree. Due to this geometric seal/seat interface problem the integrity of the seal is often compromised and it is difficult to completely stop the flow of fluid through the valve.

Because the periphery of the disc is used as the seal contact surface for the valve, it is critical to proper seal performance that the disc be precisely centered within the valve body. To this end, various structures have been incorporated into conventional rotary valve assemblies to permit the installed disc to be adjusted within the valve body in a manner effecting this necessary disc centering. This centering adjustment, of course, must be carefully and accurately performed to achieve the desired sealing effectiveness. Adjustment error, on the other hand, can seriously reduce the valve's sealing efficiency.

Another limitation present in rotary valves of conventional construction is related to the manner in which an actuator, a motorized device used to forcibly rotate the closure disc between its open and closed positions, is operatively mounted on the valve. In rotary valves of conventional construction an actuator base structure is formed integrally with the valve body (or permanently secured to as by welding) and projects radially outwardly from the valve body. In order to mount an actuator on the valve, an adapter structure is interposed between the actuator and the outwardly projecting base structure and secured to the actuator and base structure. This overall adapter mounting structure undesirably adds to the construction cost of the overall valve assembly and makes the fabrication of the assembly more complex and time-consuming.

As can readily be seen from the foregoing, a need exists for an improved rotary valve assembly, and associated fabrication methods therefor, which eliminate or at least substantially reduce the above-mentioned problems, limitations and disadvantages typically associated with rotary valves of conventional construction as generally described above. It is to this need that the present invention is directed.

SUMMARY OF THE INVENTION

In carrying out principles of the present invention, in accordance with a preferred embodiment thereof, a specially designed rotary valve is provided which includes a valve body and a seal structure, carried by the valve body, for forming an elliptical seating surface. A disc is rotatably carried by the valve body and has an elliptical periphery rotatable into and out of sealing engagement with the seating surface. The elliptical disc periphery has a conical shape which creates an entrance angle on the disc seating surface that provides a variety of operational benefits including a reduction in the torque required to seat and unseat the valve disc from the associated seal structure, and a reduction in the wear on both the disc periphery and the seal seating surface. Due to the reduced operational torque requirements, the parts carrying the actuation load may be smaller, and a smaller valve actuator may be used to seat and unseat the valve disc against the associated seal seating surface. Further, broader manufacturing tolerances may be utilized in conjunction with the disc and seal structures due to a wedging effect provided by the elliptical seal and disc design.

In a preferred embodiment of the rotary valve, the seal structure includes facing annular seal cartridge members, and a resilient annular seal member, representatively a Teflon seal, which is sandwiched between the facing seal cartridge members. An elliptical cavity is formed between the cartridge members and receives a portion of the seal member in a manner deforming it to and holding it in an elliptical configuration, with a radially inner annular portion of the seal member protruding from the seal cartridge members into the valve body interior for operative sealing engagement by the disc periphery. In an alternate embodiment of the rotary valve, the seal member received in the elliptical seal cavity between the seal cartridge members is of a metal material.

According to another feature of the invention, the elliptical seal cavity is formed in at least one of the facing annular seal cartridge members by resiliently deforming the originally circular cartridge member to an elliptical shape and holding the deformed cartridge member in such elliptical shape while at least a portion of the seal cavity is formed on a side of the cartridge member in a circular pattern circumscribing its central axis. The elliptically deformed cartridge member is then released, to thereby permit it to return to its original circular shape. This, in turn, deforms the originally circular seal cavity portion to an elliptical shape conforming to the elliptical shape of the disc periphery.

In accordance with another aspect of the invention, the disc is precisely centered within the valve body, and with respect to the seal structure, in automatic response to installation of the disc within the valve body using two guide members which are inserted inwardly through suitable openings in diametrically opposite flat portions on the outer periphery of the valve body which representatively has an annular configuration.

Portions of the inserted guide members have abutment portions which are brought into contact with corresponding abutment portions on the disc to automatically center it within the valve body. The positions of the abutment portions on the inserted parts of the guide members are precisely controlled by external flange portions on the guide members which abut the diametrically opposite flat portions on the exterior periphery of the valve body. Illustratively, an inner end of one of the guide members is rotatably received in a mounting structure carried on the disc, and a longitudinal portion of a disc-rotating shaft is rotatably extended through the other guide member and is rotationally locked to the mounting portion of the disc.

According to yet another feature of the present invention, a specially designed actuator support structure is secured to the valve body and substantially simplifies and reduces the cost of operatively coupling a motor-driven actuator to the outwardly projecting portion of the disc-rotating shaft. Illustratively, the actuator support structure is of a one-piece construction, is removably secured to the valve body, and is directly connectable to a selected actuator without the conventional necessity of an intermediate adapter structure interconnected between the actuator support structure and the actuator.

Representatively, the annular valve body has a circumferentially spaced pair of flat areas formed on the external periphery of the valve body on opposite sides of the longitudinal drive shaft portion projecting radially outwardly from the valve body periphery. In a preferred embodiment thereof, the one-piece actuator support structure has a generally inverted U-shaped configuration with a spaced pair of leg portions with free end portions removably secured to these flat area of the valve body, and a closed outer end portion to which a valve actuator may be directly secured.

BRIEF DESCRIPTION OF THE DRAWINGS

FIG. 4 is a reduced scale, partially elevational cross-sectional view through the rotary valve assembly taken along line 4—4 of FIG. 2;

FIG. 5 is a reduced scale, partially elevational cross-sectional view through the rotary valve assembly taken along line 5—5 of FIG., 1;

DETAILED DESCRIPTION

Figure 1:
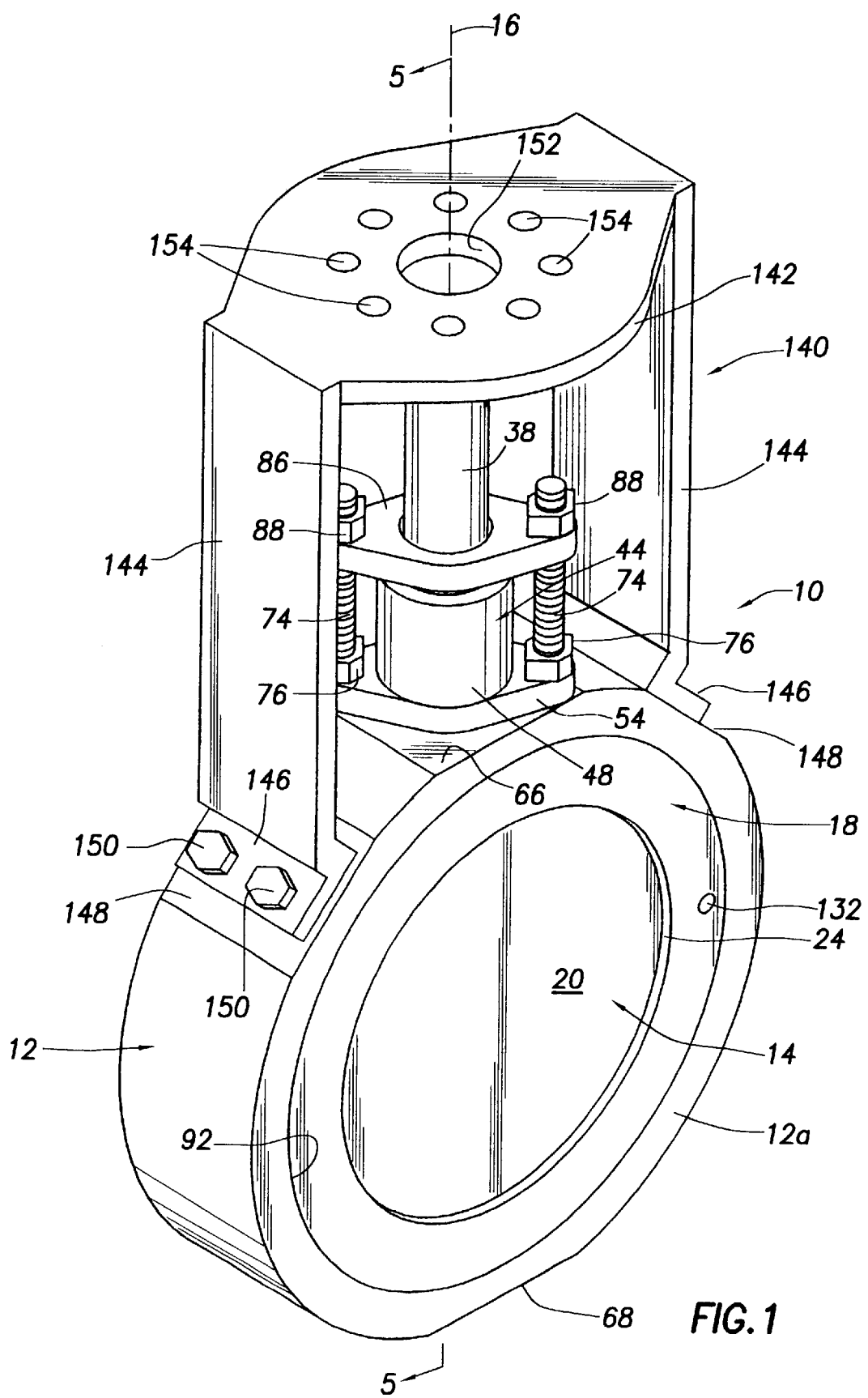
FIG. 1 is a perspective view of a specially designed rotary valve assembly embodying principles of the present invention and illustrated in a closed position.
Figure 2:
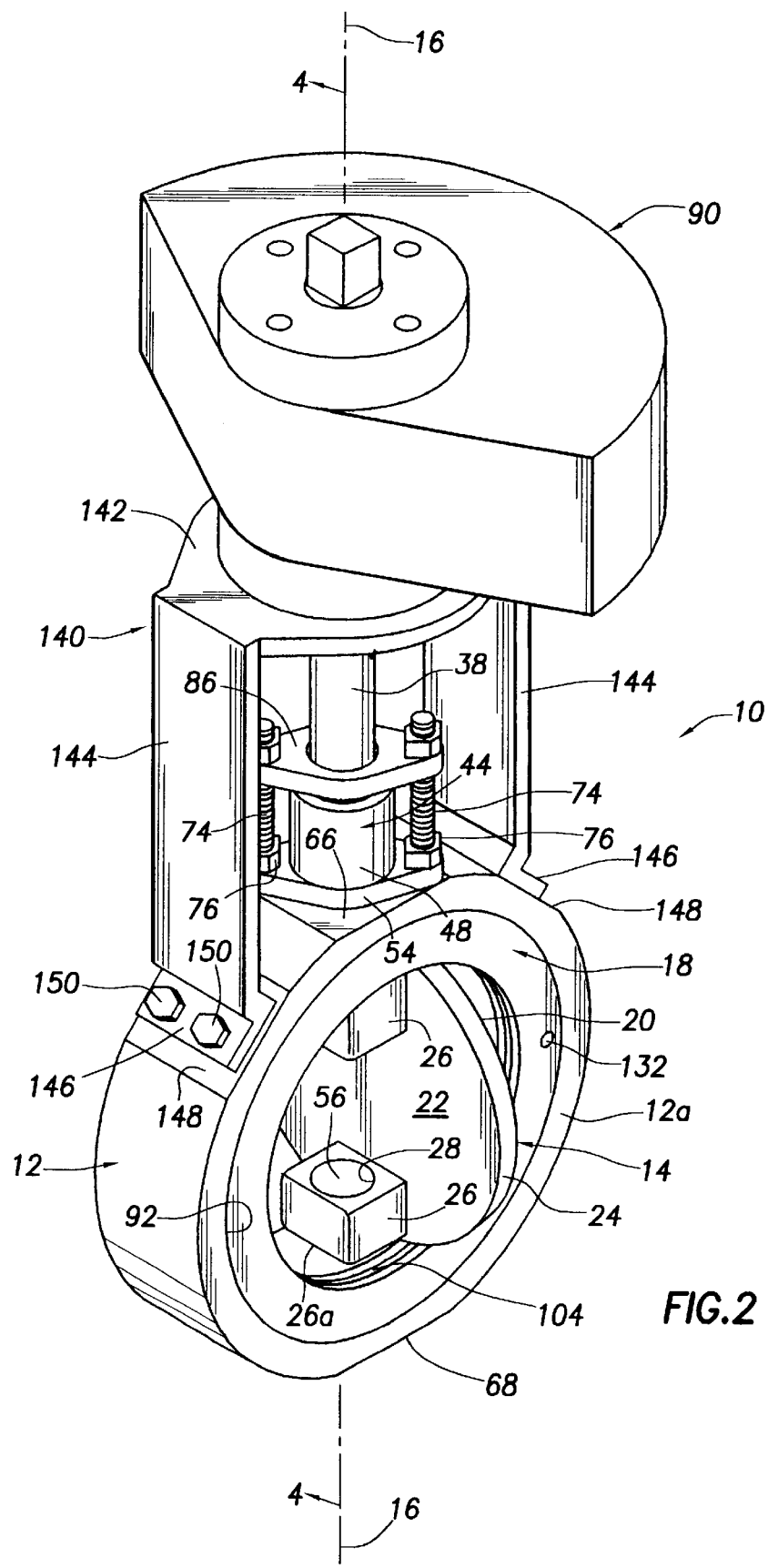
FIG. 2 is a somewhat reduced scale perspective view of the rotary valve assembly in an open position and additionally illustrating a conventional actuator mechanism mounted atop a specially designed one-piece actuator support structure portion of the valve assembly.
Figure 3:
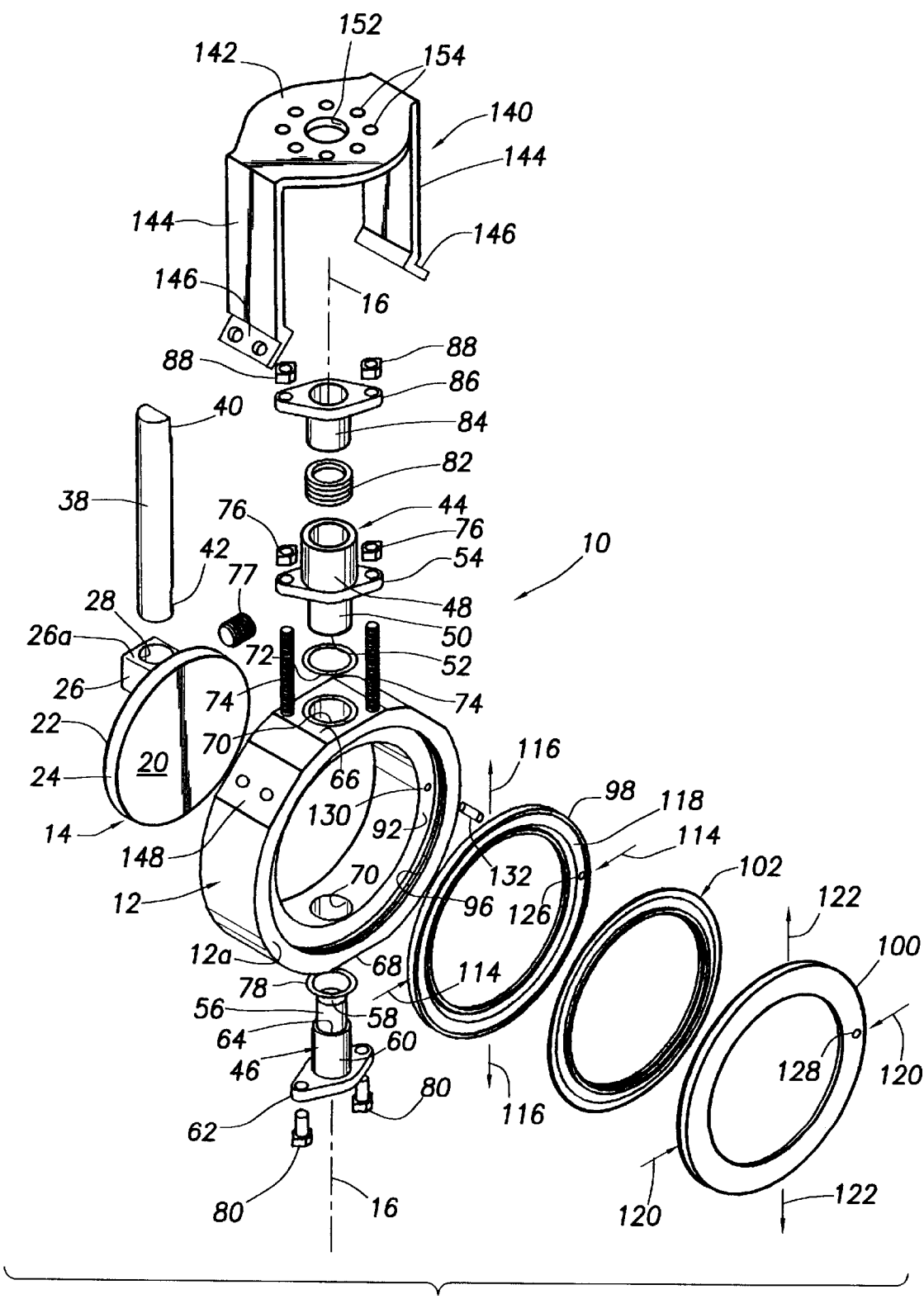
FIG. 3 is a reduced scale exploded perspective view of the rotary valve assembly.

Referring initially to FIGS. 1–3, the present invention provides a specially designed rotary valve 10 (also commonly referred to as a butterfly valve) that incorporates therein various advantages over conventionally constructed valves of this general type. Valve 10 includes an annular metal body portion 12, a metal closure disc 14 rotatable between closed and open positions (respectively illustrated in FIGS. 1 and 2) about an axis 16 extending diametrically through the body 12, and an annular seal cartridge structure 18. With the disc 14 in its FIG. 1 closed position it cooperates with the seal cartridge structure 18 to prevent fluid flow through the interior of the body 12 and piping sections (not shown) operatively connected to its opposite sides. Alternatively, with the disc 14 in its FIG. 2 open position, fluid flow through the interior of the valve body 12, and piping operatively coupled to the valve body 12, is permitted.

Figure 7:
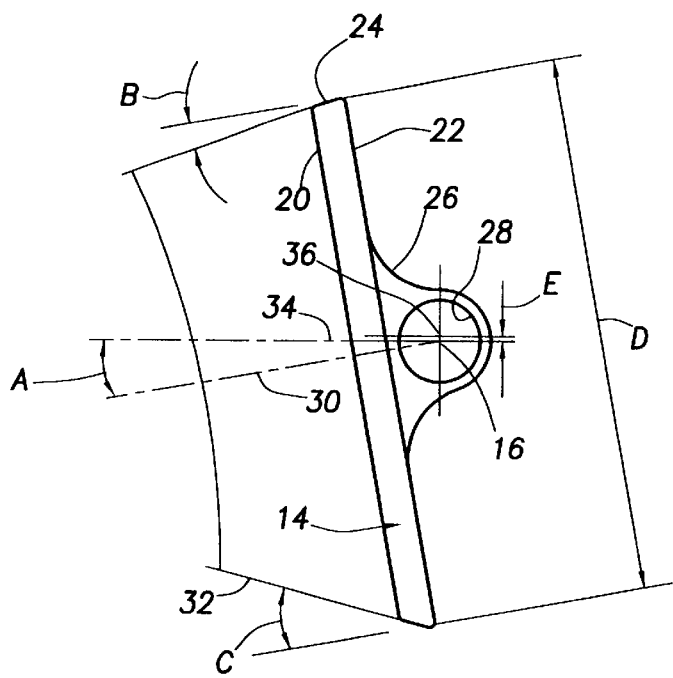
FIG. 7 is a side edge view of a valve disc portion of the rotary valve assembly schematically illustrating the manner in which the disc is machined to an elliptical peripheral configuration.
Figure 8A:
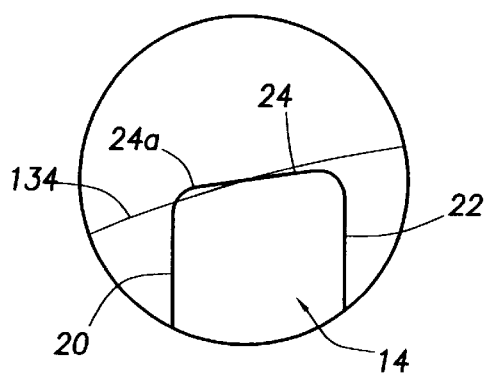
FIG. 8A is an enlarged scale detail view of the circled area "8A" in FIG. 8.
Figure 8:
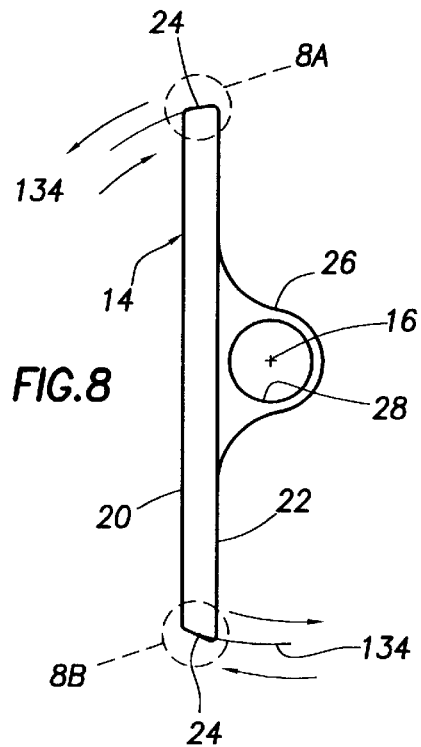
FIG. 8 is a side edge view of the completed valve disc.
Figure 8B:
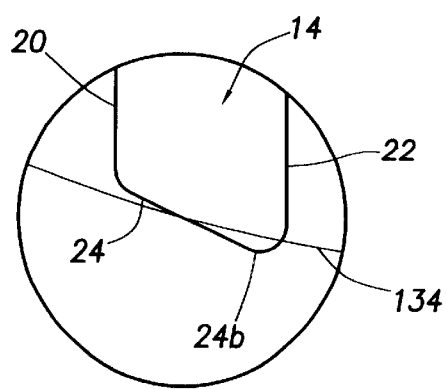
FIG. 8B is an enlarged scale detail view of the circled area "8B" in FIG. 8.

Referring now additionally to FIGS. 7–8B, the disc 14 has a body portion with a front or outer side 20, a rear or inner side 22, and a peripheral sealing edge portion 24. A diametrically spaced pair of attachment bosses 26 extend outwardly from the rear side 22 and have aligned, circularly cross-sectioned bores 28 extending through oppositely facing outer side surfaces 26a of the bosses 26. For purposes later described herein, the outer side surfaces 26a are equidistant from the centerline of the body portion of the disc 14.

The body of the disc 14, as schematically illustrated in FIG. 7 has a centerline 30, and is formed (by appropriately machining its outer edge) as a segment of a cone 32 having an axis 34 tilted at a relatively small angle A relative to the disc body centerline 30. Representatively, the angle of the cone 32 is approximately 34°, and the machining tilt angle A is approximately 8°. This machining of the body of the disc 14 as a segment of the cone 32 gives the peripheral sealing edge portion 24 of the disc an elliptical shape in which the major rear side diameter D of the disc body, which extends transversely to the disc rotational axis 16, is greater than the minor rear side diameter of the disc 14 which extends parallel to the disc rotational axis 16.

The machining of the body of the disc 14 as a segment of the cone 32 also gives portions of the disc periphery 24 adjacent opposite ends of the major diameter D different slope angles from the rear side 22 of the disc body to the front side 20 of the disc body. Representatively, an upper portion of the disc periphery 24 (as viewed in FIG. 7) slopes outwardly and radially inwardly at an angle B of approximately 15°, and a lower portion of the disc periphery 24 (as viewed in FIG. 7) slopes outwardly and radially inwardly at an angle C of approximately 31°. In a conventional manner, the bore centerlines 36 of the attachment bosses 26 are offset a small distance E from the rotational axis 16 of the closure disc 14 to effect a desirable "camming" action of the disc as it lifts off of a seal structure later described herein.

With reference now to FIGS. 1–5, the disc 14 is rotatably mounted within the annular valve body 12, in a unique automatic centering manner which will now be described, using a cylindrical shaft 38 having flats 40,42 respectively formed on upper and lower end portions thereof (see FIG. 3), and upper and lower cylindrical guide members 44,46. The upper guide member 44 is of a hollow tubular configuration and has an upper body portion 48, a reduced diameter lower body portion 50 having a lower end 52, and an elongated transverse mounting flange 54 disposed at the junction of the body portions 48,50. The lower guide member 46 has a cylindrical upper body portion 56 with an upper end 58, an enlarged diameter cylindrical lower body portion 60, and an elongated transverse mounting flange 62 at its bottom end. An upwardly facing annular shoulder 64 is defined at the juncture of the upper and lower body portions 56,60.

As best illustrated in FIGS. 3–5, the annular valve body portion 12 has diametrically opposite upper and lower flat portions 66,68 formed on its outer peripheral surface and having circular bores 70 formed therethrough and spaced apart along the disc rotation axis 16. The parallel planes of these upper and lower flat portions 66,68 are positioned on the valve body 12 in a manner such they are equal radial distances away from the centerline of the body 12.

The closure disc 14 is installed within the interior of the valve body 12 by placing the disc bosses 26 within the interior of the body 12, inserting the tubular lower end portion 50 of the upper guide member 44 downwardly through an annular gasket 72, the upper circular bore 70 and into the interior of the valve body 12. As the upper guide member 44 is being moved downwardly in this manner, the upper end portions of a pair of threaded studs 74 pass upwardly through mounting holes in the opposite ends of the flange 54. When the flange 54 bottoms out on the upper flat area 66, nuts 76 are threaded onto the studs 74 to hold the flange 66 against the upper valve body flat area 66. A lower end portion of the shaft 38 is passed downwardly through the installed upper guide member 44 and into the bore 28 of the upper disc boss 28, and is secured in place within the upper boss 28 by a set screw 77 threaded into a corresponding opening in the upper disc boss 28 and forced against the lower shaft flat area 42. As best illustrated in FIG. 4, the lower end 52 of the lower body portion 50 of the upper guide member 44 abuts the upper side surface 26a of the upper disc boss 26.

The upper end portion 56 of the lower guide member 46 is passed upwardly through an annular gasket 78, the lower valve body circular bore 70 and into the circular bore 28 in the lower disc boss 26 until the lower guide member flange 62 comes into abutment with the lower flat area 68 on the annular valve body 12. The flange 62 is held against the flat area 68 by a pair of bolts 80 extended upwardly through corresponding holes in the flange 62 and threaded into aligned holes in the valve body 12. The mounting of the upper and lower guide members 44,46 in this manner supports the disc 14 within the valve body 12 for rotation relative thereto about the rotational axis 16.

Such mounting of the upper and lower guide members 44,46 also automatically centers the disc 14 within the valve body 12, and relative to the later described annular seal cartridge structure 18, without any necessity of subsequently adjusting the installed disc 14 relative to the valve body 12 or seal cartridge structure 18. This automatic disc centering is achieved by axially configuring the upper and lower cylindrical guide members 44,46 in a manner Such that when they are operatively secured to the valve body 12 as described above the distance between the lower end 52 of the upper guide member 44 and the annular flange portion 64 of the lower guide member 46 is precisely identical to the distance between the oppositely facing outer sides 26a of the disc bosses 26 (which, as previously mentioned, are representatively equidistant from the centerline of the disc body). In this manner, because the distances between the valve body upper and lower flat areas 66,68 are identical, the disc 14 is automatically centered within the valve body 12 by the abutments 26a,52 and 26a,64 between the guide members 44,46 and the disc bosses 26, when the guide member flanges 54,62 respectively abut the valve body flat areas 66,68.

The shaft 38 extends upwardly through an annular packing structure 82 (see FIG. 3) received within the upper body portion 48 of the upper guide member 44. Shaft 38 also passes through and upwardly beyond a tubular packing retainer member 84 telescoped within the upper body portion 48 and having a transverse flange portion 86 on its upper end. As illustrated, the studs 74 pass upwardly through corresponding holes in the outer ends of the flange 86, with the packing retainer member 84 being held in place with nuts 88 threaded onto the upper ends of the studs 74. An upper end portion of the shaft 38 is operatively connected to a conventional motorized actuator 90 which, as later described herein, is operatively associated with the valve body 12 in a unique manner. The actuator 90 may be selectively utilized to forcibly rotate the shaft 38 about the disc rotation axis 16 to thereby forcibly rotate the disc 14 between its FIG. 1 closed position and its FIG. 2 open position.

With reference now to FIGS. 1–6A, the annular seal cartridge structure 18 is complementarily and removably received within an annular recess 92 (see FIG. 3) formed in the side 12a of the valve body 12 and is captively retained within the recess 92 by means of a snap ring 94 (see FIG. 5) removably received in an annular groove 96 (see FIG. 3) in the valve body recess 92. The seal cartridge structure 18 includes a flat annular metal seal support member 98, a flat annular metal seal retaining member 100, and an annular seal member 102 sandwiched between the members 98 and 100.

Figure 6:
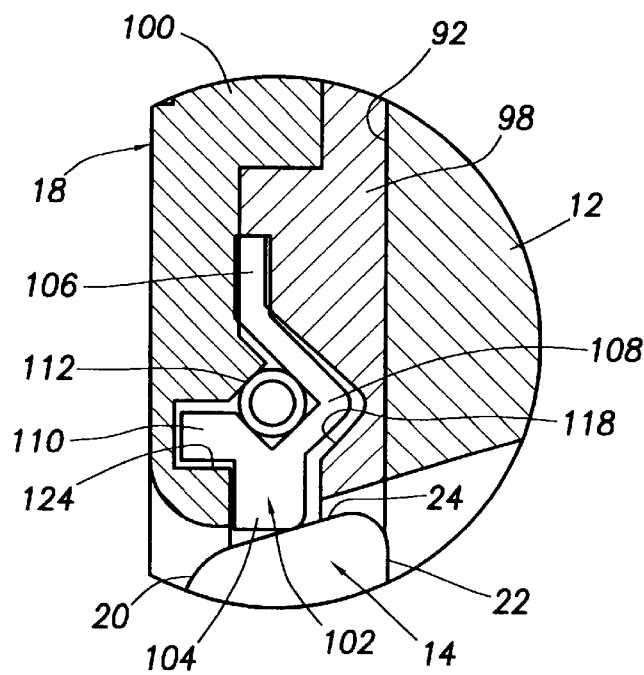
FIG. 6 is an enlarged scale cross-sectional view of the circled area "6" in FIG. 5 and illustrates the construction of a specially designed seal cartridge portion of the rotary valve assembly.

Representatively, the annular seal member 102 is substantially identical to the seal member 24 illustrated and described in U.S. Pat. No. 4,005,848 to Eggleston and comprises an annular Teflon body having (as best illustrated in FIG. 6) an annular, radially inner sealing portion 104; an annular, radially outer peripheral portion 106; an annular, axially inwardly projecting flexible web portion 108; and an annular, axially outwardly projecting lip portion 110. An annular resilient garter spring member 112 outwardly circumscribes the annular sealing portion 104 and exerts thereon a radially inwardly directed resilient biasing force.

According to a feature of the present invention, the seal member 102 is held by the balance of the seal cartridge structure 18 in a manner causing the sealing portion 104 of the seal member 102 to assume an elliptical shape precisely corresponding to the elliptical configuration of the peripheral edge 24 of the disc 14 to provide substantially improved valve sealing performance as later described herein.

In order to hold the originally round annular seal member 102 in this elliptical configuration the seal support and retainer members 98 and 100 are specially constructed in a unique manner which will now be described. using a suitable clamping structure, the seal support member 98 is subjected to diametrically opposite, radially inwardly directed clamping forces 114 (see FIG. 3) that resiliently deform opposite edge portions of the seal support member 98 radially inwardly, while at the same time correspondingly and resiliently deforming the member 98 radially outwardly in directions 116 transverse to the clamping forces 114, thereby giving the seal support member 98 an elliptical configuration.

While the seal support member 98 is being held in this resiliently deformed elliptical configuration, a circular seal receiving depression 118 (see FIG. 3) is suitably machined on one side of the deformed seal support member 98. The temporarily clamped seal support member 98 is then released to permit it to return to original circular configuration, thereby causing the circular depression 118 to assume an elliptical configuration in the finished inner seal support member 98 (see FIG. 6).

In a similar manner, the seal retainer member 100 is placed in the clamping structure and subjected to diametrically opposite, radially inwardly directed clamping forces 120 (see FIG. 3) that resiliently deform opposite edge portions of the seal retaining member 100 radially inwardly, while at the same time correspondingly and resiliently deforming the member 100 radially outwardly in directions 122 transverse to the clamping forces 120, thereby giving the seal retaining member 100 an elliptical configuration. While the seal retainer member 100 is held in this elliptical configuration, a circular depression 124 (see FIG. 6) is formed in the side of the seal retaining member 100 which will face the seal support member 98. The temporarily clamped seal retainer member 100 is then released to permit it to return to original circular configuration, thereby causing the circular depression 124 to assume an elliptical configuration in the finished inner seal support member 98.

Suitable marks (not shown) are placed on each of the completed seal support and retainer members 98,100 so that when the seal member 102 is operatively sandwiched therebetween, the elliptical depressions 118,124 may be precisely aligned with one another. When the seal member 102 is operatively sandwiched between the seal support and retainer members 98,100 as cross-sectionally illustrated in FIG. 6, the seal portion 108 is received in the elliptical depression 118, the seal portion 110 is received in the depression 124, and the seal portion 106 is clamped between facing portions of the seal support and retainer members 98 and 100, with an inner peripheral portion of the seal member sealing portion 104 projecting radially inwardly beyond the inner peripheries of the seal support and retainer members 98 and 100. To operatively install the annular seal member 102 in the elliptical depressions 118 and 124, the seal member must be slightly deformed from its originally round configuration to an elliptical configuration which geometrically matches the elliptical shape of the previously described elliptical periphery 24 of the disc 14. Accordingly, in the assembled seal cartridge structure 18 the inwardly projecting periphery of the seal member sealing portion 104 is uniquely held in this elliptical configuration.

With the seal support and retainer members 98,100 rotationally aligned with one another, the completed seal cartridge structure 18 is installed in the valve body side recess 92 (see FIGS. 1–3) in a manner such that aligned holes 126,128 in the seal support and retainer members 98,100 are aligned with an underlying hole 130 in the axially inner surface of the valve body seal cartridge recess 92 to thereby align the major axis of the now elliptical seal portion 104 with the major axis of the elliptical disc periphery 24 when the disc is rotationally driven to its FIG. 1 closed orientation. To retain the installed seal cartridge structure 18 in this operative orientation, a retaining pin 132 is operatively positioned in the aligned holes 126,128,130.

When the disc 14 is rotationally driven between its open and closed positions, as indicated by the directional arrows in FIG. 8, the elliptical disc periphery 24 is driven through the rotational arc 134 shown in FIGS. 8–8B to cause the indicated portions 24a,24b of the disc periphery 24 to be selectively wedged into sealing engagement with the radially inner periphery of the resilient seal portion 104 (see FIG. 6) and then be disengaged therefrom.

Due to the unique mating of elliptical disc and seal surfaces in the valve 10, a variety of advantages are achieved. For example, the torque required to seat and unseat the valve disc 14 from the associated seal element is substantially less than in the conventional case of a round disc seating against a round seal element. Additionally, there is less wear on the disc and seal element. Further, due to the reduced operational torque requirements, the parts carrying the actuation load may be smaller, and a smaller actuator may be used to seat and unseat the valve disc against the seal. Also, broader manufacturing tolerances may be utilized in conjunction with the disc and seal due to the wedging effect provided by the elliptical seal and disc design.

Figure 6A:
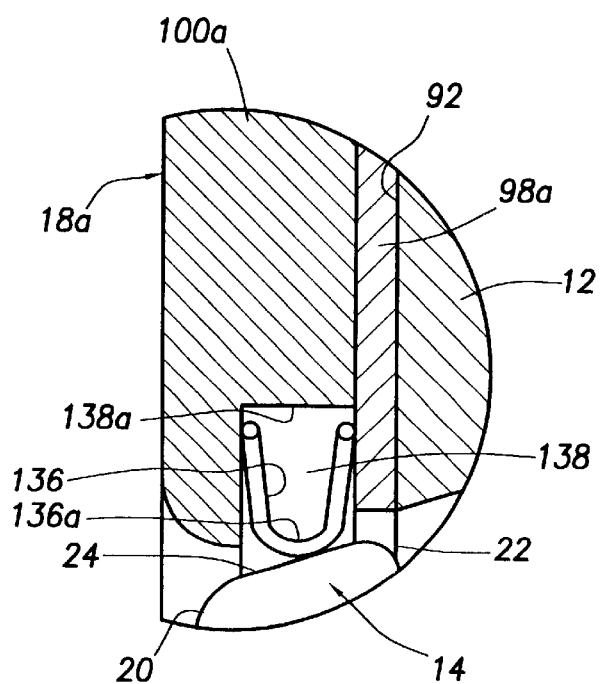
FIG. 6A is a cross-sectional view similar to that in FIG. 6 but illustrating an alternate embodiment of the seal cartridge portion.

An alternate embodiment 18a of the previously described seal cartridge structure 18 is cross-sectionally illustrated in FIG. 6A and operatively supports a deformable annular metal seal element 136 having a generally U-shaped cross-section around its periphery. The seal element 136 is sandwiched between modified flat annular seal support and retainer members 98a,100a which are operatively received and retained within the valve body side recess 92, with a rounded, radially inner annular portion 136a of the metal seal member 136 projecting inwardly from the seal support and retainer members 98a,100a for operative sealing engagement by the disc periphery 24.

In constructing the modified seal cartridge structure 18a, the seal support member 98a is left in its original flat annular configuration, and the seal retainer member 100a is resiliently deformed to an elliptical shape, by clamping it at diametrically opposite portions as previously described for the seal retainer member 100, while a circular depression 138 is machined into the inner side surface of the seal retainer member 100a on a radially inner peripheral area thereof. When the resiliently deformed seal retainer member 100a is unclamped, it springs back from an elliptical configuration to its original circular configuration to thereby reconfigure the circular depression 138 in a manner such that its outer peripheral surface 138a has an elliptical shape. With the annular metal seal 136 captively retained in the depression 138 in the assembled seal cartridge structure 18a, forcible engagement of the seal portion 136a by the disc periphery 24 deforms the seal 136 toward the elliptical shape bounded by the elliptical recess surface 138a, thereby providing the valve 10 with elliptical-to-elliptical sealing configuration advantages similar to those discussed above in conjunction with the flexible Teflon seal structure 102 shown in FIG. 6.

Returning now to FIGS. 1–4, in addition to the unique self-centering disc support and elliptical-to-elliptical seal interface features of the present invention, the invention also substantially simplifies and reduces the cost of the rotational driving interconnection between the motor-driven actuator 90 (see FIG. 2) and the shaft 38 and thus the closure disc 14. These advantages are achieved by the use of a one-piece actuator support bracket 140 which is removably securable to the valve body 12 and may be easily customized to operatively mount motor-driven actuators of a variety of types and configurations and permit them to be drivingly coupled to the shaft 38.

Actuator bracket 140 has a generally inverted U-shaped configuration with a top end support plate portion 142, and a pair of depending parallel leg plate portions 144 having outwardly angled foot portions 146 that may be removably secured to flat portions 148 on the valve body 12, on opposite sides of the top flat portion 66, with suitable fasteners such as bolts 150. Alternatively, the actuator bracket 140 may be welded to the valve body 12, or otherwise suitably anchored thereto.

The top plate 142 is suitably drilled, as at openings 152 and 154, as required to accommodate the particular motor-driven actuator (for example, the illustrated actuator 90) to be used in conjunction with the balance of the valve 10. Accordingly, a single actuator bracket may be used as a universal mount structure to operatively couple a selected one of a variety of differently configured actuators to a given rotary valve 10. With the actuator 90 operatively mounted atop the top end plate 142 (see FIG. 4) a rotational output portion 90a of the actuator 90 extends downwardly through the central upper end plate opening 152 and is drivingly coupled to the upper end of the shaft 38.

Using this unique universal actuator support structure feature of the present invention it is no longer necessary, as is required in rotary valves of conventional construction, to supply and utilize additional intermediate bracket structures between a base support structure, formed integrally with the valve body 12, and the selected actuator. In turn, this desirably simplifies the design of the valve body 12, and allows the valve body 12 to be produced from various materials, depending on the valve flow media, without changing the bracket material.

The foregoing detailed description is to be clearly understood as being given by way of illustration and example, the spirit and scope of the present invention being limited solely by the appended claims.

What is claimed is:

1. A rotary valve comprising:
   a valve body;
   a seal structure, carried by said valve body, for forming an elliptical seating surface, said seal structure including opposing annular first and second seal cartridge members having a cavity defined therebetween, and an annular seal member received in said cavity and protruding from said cavity for engagement by said elliptical periphery of said disc; and
   a disc rotatably carried by said valve body and having an elliptical periphery rotatable into and out of sealing engagement with said seating surface,
   said annular seal member protruding from said cavity for engagement by said elliptical periphery of said disc,
   said annular seal member being of a resilient material, and
   said cavity having an elliptical configuration and resiliently deforming said annular seal member to an elliptical shape.

2. The rotary valve of claim 1 wherein:
   said annular seal member has a radially outer peripheral portion clamped between opposing portions of said first and second seal cartridge members.

3. The rotary valve of claim 1 further comprising:
   a shaft having a first longitudinal portion extending inwardly through said valve body and being rotationally locked to said disc, and a second longitudinal portion disposed externally of said valve body and being drivingly rotatable to cause a corresponding rotation of said disc about said axis, and
   an actuator support structure secured to the exterior of said valve body and being connectable directly to an actuator useable to drivingly rotate said second longitudinal portion of said shaft.

4. The rotary valve of claim 3 wherein said actuator support structure is of a one-piece construction and is removably secured to said valve body.

5. The rotary valve of claim 4 wherein:
   said valve body has a generally annular configuration with a circumferentially spaced pair of flat areas formed on the external periphery of said valve body on opposite sides of said second longitudinal portion of said shaft, and
   said one-piece actuator support structure has a generally inverted U-shaped configuration with a spaced pair of leg portions with free end portions removably secured to said flat areas of said valve body, and a closed outer end portion to which a valve actuator may be directly secured.

6. A rotary valve comprising:
   a valve body having an interior;
   a seal structure carried by said body and defining a seating surface;
   a disc carried within said valve body interior for rotation relative to said valve body about an axis and having a periphery rotatable into and out of sealing engagement with said seating surface; and
   abutting fixed geometry structures carried by said valve body and said disc and functioning to hold said disc in a precisely centered orientation within said interior of said valve body, said abutting fixed geometry structures including first and second guide structures spaced apart along said axis and extending inwardly into said interior of said valve body, and a mounting structure carried by said disc and having oppositely facing surfaces spaced apart along said axis and abutting said first and second guide structures,
   said valve body having an annular shape with diametrically opposite, parallel flat areas formed on the exterior periphery thereof and spaced apart along said axis, said flat areas having openings extending radially therethrough and removably receiving said first and second guide structures, and
   said first and second guide structures having enlarged portions abutting said flat areas and preventing further movement of said first and second guide structures into said interior of said valve body.

7. A rotary valve comprising:
   a valve body having an interior;
   a seal structure carried by said body and defining a seating surface;
   a disc carried within said valve body interior for rotation relative to said valve body about an axis and having a periphery rotatable into and out of sealing engagement with said seating surface; and
   abutting fixed geometry structures carried by said valve body and said disc and functioning to hold said disc in a precisely centered orientation within said interior of said valve body, said abutting fixed geometry structures including first and second guide structures spaced apart along said axis and extending inwardly into said interior of said valve body, and a mounting structure carried by said disc and having oppositely facing surfaces spaced apart along said axis and abutting said first and second guide structures; and
   a shaft rotatably locked to said disc, said shaft having a longitudinal portion rotatably extending through one of said first and second guide structures.

8. A rotary valve comprising:

a valve body having an interior;

a seal structure, carried by said valve body, for forming an elliptical seating surface;

a disc carried by said valve body for rotation relative thereto about an axis and having an elliptical periphery rotatable into and out of sealing engagement with said seating surface; and abutting fixed geometry structures carried by said valve body and said disc and functioning to hold said disc in a precisely centered orientation within said interior of said valve body, said abutting fixed geometry structures including first and second guide structures spaced apart along said axis and extending inwardly into said interior of said valve body, and a mounting structure carried by said disc and having oppositely facing surfaces spaced apart along said axis and abutting said first and second guide structures, said valve body having an annular shape with diametrically opposite parallel flat areas formed on the exterior periphery thereof and spaced apart along said axis, said flat areas having openings extending radially therethrough and removably receiving said first and second guide structures, and said first and second guide structures having enlarged portions abutting said flat areas and preventing further movement of said first and second guide structures into said interior of said valve body.

9. A rotary valve comprising:

a valve body having an interior;

a seal structure, carried by said valve body, for forming an elliptical seating surface;

a disc carried by said valve body for rotation relative thereto about an axis and having an elliptical periphery rotatable into and out of sealing engagement with said seating surface;

abutting fixed geometry structures carried by said valve body and said disc and functioning to hold said disc in a precisely centered orientation within said interior of said valve body, said abutting fixed geometry structures including first and second guide structures spaced apart along said axis and extending inwardly into said interior of said valve body, and a mounting structure carried by said disc and having oppositely facing surfaces spaced apart along said axis and abutting said first and second guide structures; and a shaft rotatably locked to said disc, said shaft having a longitudinal portion rotatably extending through one of said first and second guide structures.

10. A rotary valve comprising:

a valve body having an interior;

a seal structure carried by said valve body and defining a seating surface;

a disc carried within said valve body interior for rotation relative to said valve body about an axis and having a periphery rotatable into and out of sealing engagement with said seating surface; and abutting fixed geometry structures carried by said valve body and said disc and functioning to hold said disc in a precisely centered orientation within said interior of said valve body, said abutting fixed geometry structures including:

first and second guide structures spaced along said axis, extending inwardly into said interior of said valve body, and having flat, axially facing bearing surfaces, and a mounting structure carried by said disc and having enlarged portions with axially facing surfaces spaced apart along said axis and axially and slidably abutting said bearing surfaces of said first and second guide structures.

11. The rotary valve of claim 10 wherein one of said first and second guide structures has a portion rotatably coupled to said mounting structure.

12. A rotary valve comprising:

a valve body having an interior;

a seal structure, carried by said valve body, for forming an elliptical seating surface;

a disc carried by said valve body for rotation relative thereto about an axis; and abutting fixed geometry structures carried by said valve body and said disc and functioning to hold said disc in a precisely centered orientation within said interior of said valve body, said abutting fixed geometry structures including:

first and second guide structures spaced along said axis, extending inwardly into said interior of said valve body, and having flat, axially facing bearing surfaces, and a mounting structure carried by said disc and having enlarged portions with axially facing surfaces spaced apart along said axis and axially and slidably abutting said bearing surfaces of said first and second guide structures.

13. The rotary valve of claim 12 wherein one of said first and second guide structures has a portion rotatably coupled to said mounting structure.

* * * * *